(12) United States Patent
Bratkovski et al.

(10) Patent No.: US 8,327,721 B2
(45) Date of Patent: Dec. 11, 2012

(54) SENSOR FABRIC FOR SHAPE PERCEPTION

(75) Inventors: Alexandre Bratkovski, Mountain View, CA (US); Ivan Naumov, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 412 days.

(21) Appl. No.: 12/605,565

(22) Filed: Oct. 26, 2009

(65) Prior Publication Data

US 2011/0094306 A1   Apr. 28, 2011

(51) Int. Cl.
 *G01D 7/00* (2006.01)
(52) U.S. Cl. ............................................... 73/862.046
(58) Field of Classification Search .............. 73/862.046
 See application file for complete search history.

(56) References Cited

U.S. PATENT DOCUMENTS

| | | | | |
|---|---|---|---|---|
| 5,040,876 A | * | 8/1991 | Patel et al. | 349/128 |
| 5,357,358 A | * | 10/1994 | Durand et al. | 349/125 |
| 5,436,450 A | * | 7/1995 | Belcher et al. | 250/332 |
| 5,657,295 A | * | 8/1997 | Howard | 367/140 |
| 5,760,530 A | * | 6/1998 | Kolesar | 310/339 |
| 7,791,248 B2 | * | 9/2010 | Cross et al. | 310/311 |
| 8,069,735 B1 | * | 12/2011 | Egorov et al. | 73/862.046 |

* cited by examiner

*Primary Examiner* — Lisa Caputo
*Assistant Examiner* — Octavia D Davis (57) ABSTRACT

A sensor fabric has a plurality of flakes of a flexoelectric material and electrodes as threads for connecting the flakes together. Each flake has at least one pair of opposite edges connected by two separate electrodes. When the sensor fabric is placed in contact with the surface of an object, the flake is bent along the contour of the object surface. The bending of the flexoelectric flake generates a polarization voltage between its opposite edges, which can be measured via the electrodes to determine the local surface contour of the object.

17 Claims, 6 Drawing Sheets

SENSOR FABRIC FOR SHAPE PERCEPTION

Robotics, the engineering science and technology of robots, has come a long way since the word "robot" was coined in the early twentieth century. Nevertheless, it is still a challenge to replicate or mimic some basic human sensory functions in robotic devices. For instance, it has been very difficult to mimic the sense of touch. While a human hand can easily sense the shape of an object and other attributes such as temperature and stiffness by simply touching the object, it has not been an easy task for sensors in modern robotic devices to obtain shape information by touch. Some prior attempts for shape perception by touch are based on MEMS devices for electro-mechanical responses. Such sensing devices have many issues. They are bulky and complicated, and produce small signals that require highly sensitive signal amplification for detection. As a result, they are hardly useful for integration into systems of interest, such as robotic hands.

BRIEF DESCRIPTION OF THE DRAWINGS

Some embodiments of the invention are described, by way of example, with respect to the following figures.

DETAILED DESCRIPTION

Figure 1:
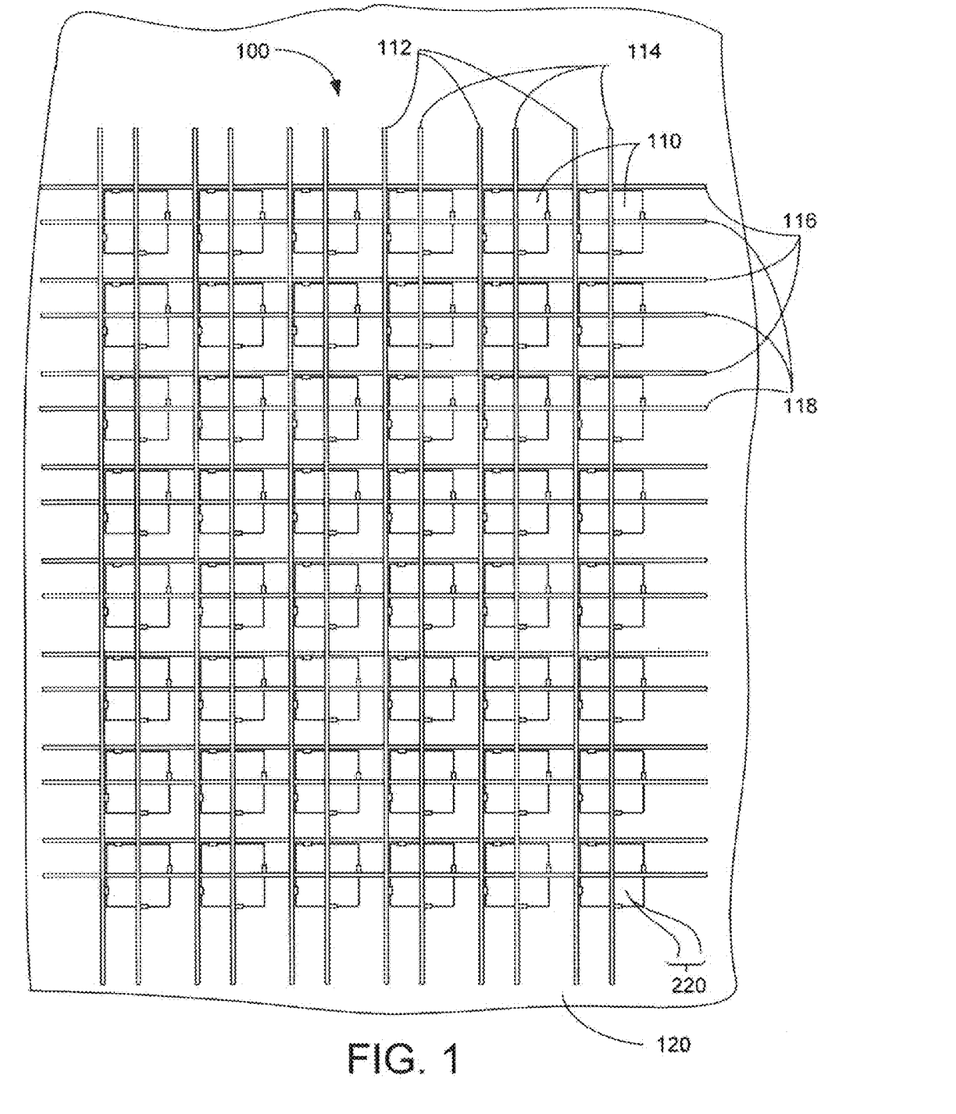
FIG. 1 is a schematic top view of a sensor fabric in accordance with an embodiment of the invention.

FIG. 1 shows a sensor fabric 100 in accordance with an embodiment of the invention. The sensor fabric 100 is formed of a collection of flakes 110 of a flexoelectric material that are "threaded together" by electrodes 112, 114, 116, and 118. As described in greater detail below, the sensor fabric can be used for touching sensing to detect the shape, texture, stiffness, and other attributes of an object, and can be made to have a high sensor density and high sensitivity.

The flexoelectric flakes 110 and the electrodes connecting them may be supported by a substrate 120 to provide structural strength and dimensional stability of the fabric 100. In some embodiments, the substrate 120 may be formed of a web material, such as a plastic sheet, that is flexible. The flexibility allows the sensor fabric to follow the surface contour of an object when it is pressed against, or "touches," the object surface. The flexoelectric flakes 110 and the electrodes may be attached to or fabricated on the substrate 120 using known techniques for fabrication of semiconductor devices and MEMS devices.

Figure 2:
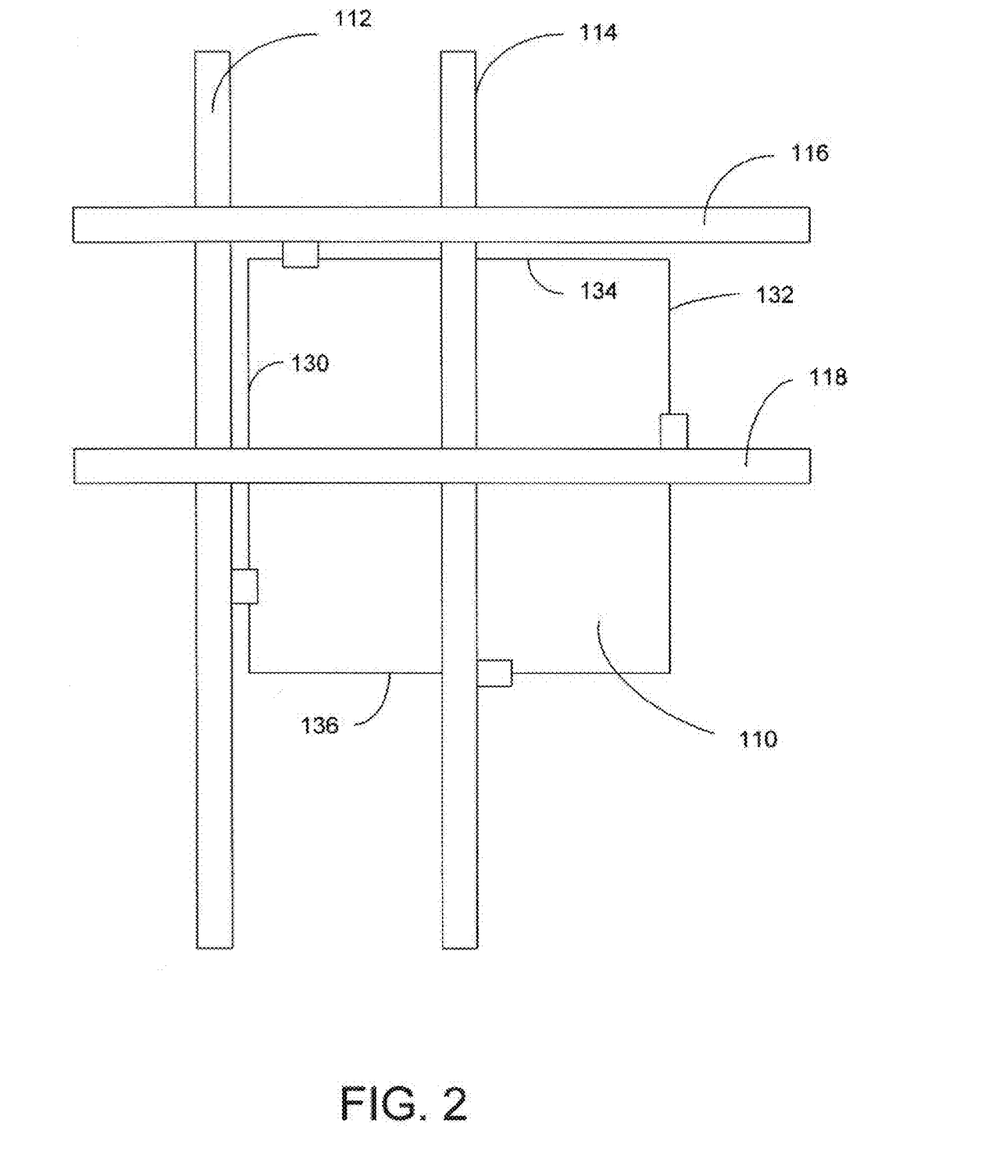
FIG. 2 is a schematic top view of a rectangular flexoelectric flake and electrodes in the sensing fabric of FIG. 1.

FIG. 2 shows one flexoelectric flake 110 in the sensor fabric 100 and its connecting electrodes 112, 114, 116, and 118. As used herein, the term "flexoelectricity" refers to an electromechanical property to generate a voltage polarization in response to strain gradients. The flake 110 is generally two-dimensional (2D) in that its thickness is significantly smaller than its length and width. For example, the width and length of the flake may range from tens of nanometers to micrometers or even larger, while the thickness of the flake in some embodiments may be as small as one atomic layer. For sensing purposes, the flake 110 has electrodes connected to at least one pair of its opposite edges. In the illustrated embodiment, the flake 110 has a rectangular shape (which may be a square) and has two pairs of opposite edges. Electrodes 112, 118 are connected to the opposite edges 130 and 132, respectively, while electrodes 116 and 114 are connected to the opposite edges 134 and 136, respectively. As described in greater detail below, having electric connections to two or more pairs of opposite edges allows the detection of the bending of the flake in different directions.

The operation of the sensor fabric 100 is based on the phenomenon that when a flexoelectric flake 110 is bent, it produces a bias voltage between its opposite edges. The bias voltage depends on the direction of the bending with respect to the lattice axes of the flexoelectric material forming the two-dimensional flake. Materials exhibiting such flexoelectric property include two-dimensional non-centrosymmetric materials such as boron nitride (BN) and boron carbon nitride ($BC_2N$).

Contrary to three-dimensional (3D) solids of flexoelectric materials, two-dimensional (2D) $sp^2$-bonded crystals are able to sustain significantly greater elastic structural distortions and exhibit exceptional forms of electromechanical coupling. It has also been discovered that 2D $sp^2$-bonded non-centrosymmetric crystals like boron nitride or boron carbon nitride exhibit another unusual flexoelectric effect: generating a macroscopic in-plane voltage polarization in response to out-of plane periodic atomic displacements. A boron nitride 2D sheet is a piezoelectric dielectric due to a broken sub-lattice inversion symmetry. In the case of boron carbon nitride, there is a further reduction in the sub-lattice symmetry, leading to the breaking of the three-fold point symmetry. In those 2D sheets, the induced local polarization is independent of the sign of the curvature and quadratic in induced curvature. The net macroscopic polarization is allowed even in cases of zero net strain, like in periodic deformation. The polarization can be quite large, on the order of 1 volt, which may be easily detected by an external circuit without the need for sensitive amplifying circuitry to amplify the signals.

Figure 4:
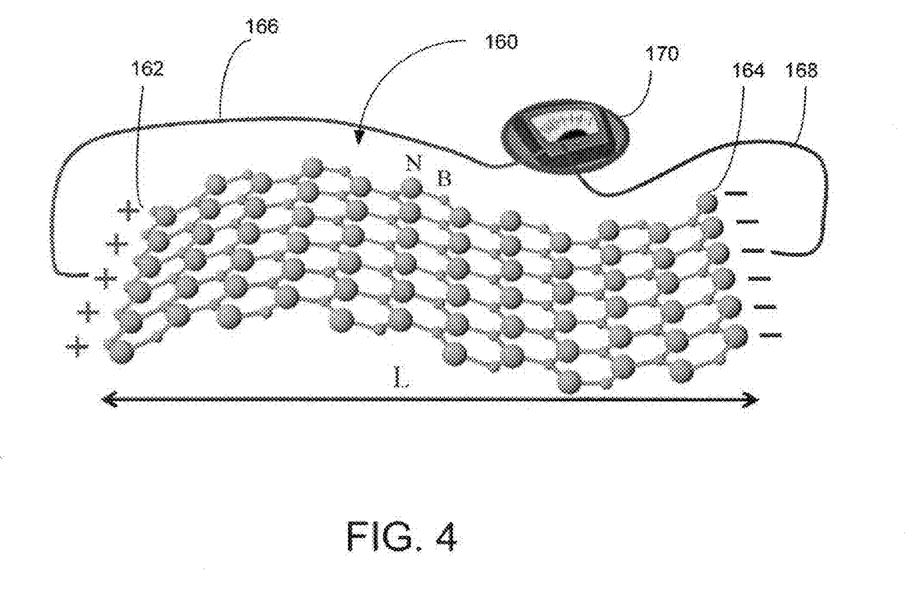
FIG. 4 is an enlarged view of a boron nitride flexoelectric sheet in a bent form and creating a voltage between its two opposite edges.

For illustration of this phenomenon, FIG. 4 shows, on an atomic scale, a single atomic layer sheet 160 of boron nitride (BN). The boron (B) atoms and nitrogen (N) atoms form a honeycomb crystal lattice with a hexagonal unit cell. When the sheet 160 is bent or curved into undulation along the line L, a bias voltage is generated between the two opposite edges 162 and 164. This voltage can be connected by electrodes 166 and 168 to an external voltage detector 170 for measurement.

Figure 5:
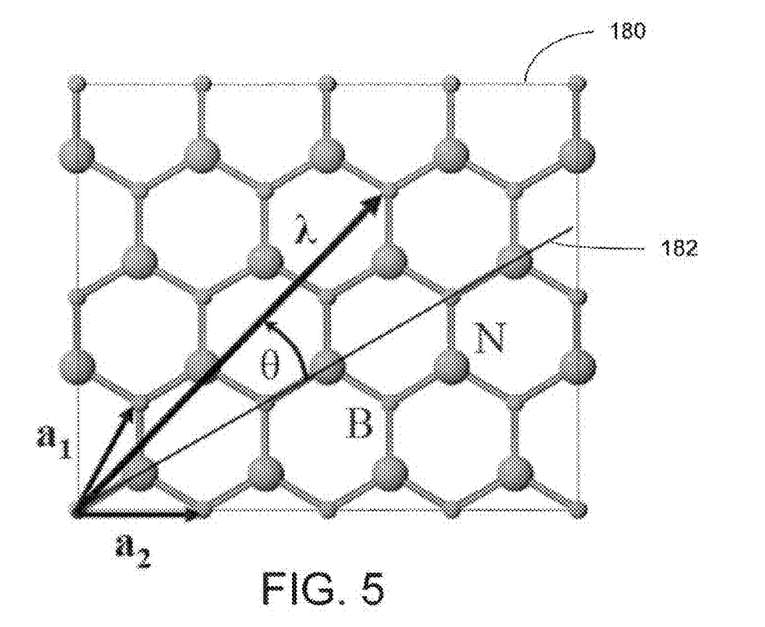
FIG. 5 is a depiction of the boron nitride crystal lattice and a bending direction in relation to a reference lattice vector.

The voltage polarization generated by the BN sheet 160 depends on the bending amplitude and wavelength, as well as the direction of the bending wave with respect to the crystalline lattice. FIG. 5 shows the lattice structure 180 of boron nitride. The vectors $a_1$ and $a_2$ are the basis vectors of the lattice. The vector $\lambda$ indicates the periodicity and orientation of the bending wave. The angle $\theta$ represents the angle between the direction of the bending wave and a reference vector defined as $(a_1+a_2)$, which is chosen in such a way that the shortest inter-atomic distance in the lattice along this vector is from the boron atom to the nitrogen atom, along the line 182.

Figure 6:
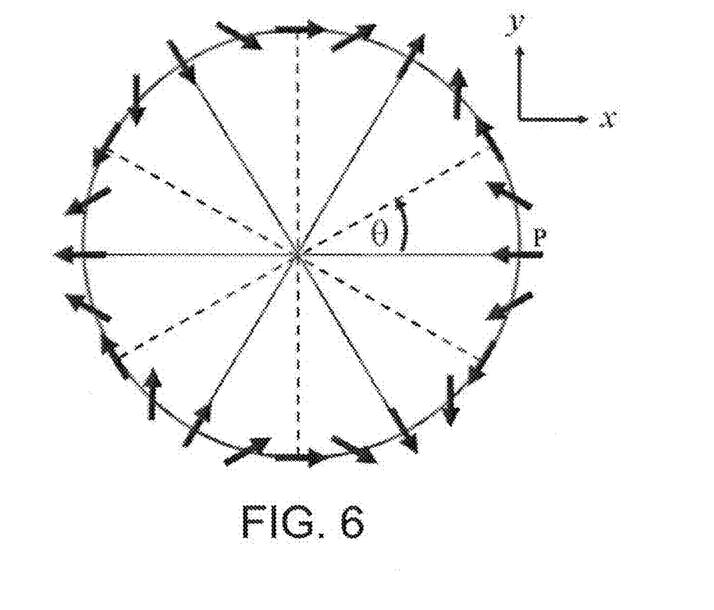
FIG. 6 is a plot showing the dependence of the polarization of the voltage generated by a boron nitride flexoelectric sheet as a function of the bending direction.

The angular dependence of the polarization P induced by the bending wave or corrugation is shown in FIG. 6. The polarization P varies as a function of the angle $\theta$, with the components of P changing as (−cos 2θ, sin 2θ). Detecting the voltages of two pairs of edges of the sheet in different directions, such as shown in FIG. 2, allows an analyzer circuit to determine the polarization and magnitude of the bending experienced by the sheet.

In FIG. 4, for illustration purposes, the BN sheet 160 is shown to have a single atomic layer. The polarization effect described above can be observed in a thin BN film or flake with an odd number of layers, such as 1, 3, 5, and on. Of the multiple layers, only one produces the uncompensated polarization, while the rest even number layers can be considered as a mechanically supporting structure or a scaffold.

Returning to FIG. 1, in accordance with a feature of an embodiment of the invention, the flakes are arranged in a two-dimensional matrix, and the electrodes connecting the flakes are formed in a "crossbar" arrangement. For each edge pair (e.g., top/bottom or right/left), there is a first group of generally parallel electrodes for connecting to the first edges of the flakes, and a second group of generally parallel electrodes for connection to the second edges of the flakes. The electrodes in the second group extend at an angle to the electrodes in the first group. For instance, in the illustrated embodiment, a first group of electrodes 112 are connected to the right edges of the flakes, while a second group of electrodes 118 are connected to the left edges of the flakes 110. In FIG. 1 the angle between the electrodes 112 and 118 is illustrated to be about 90 degrees, but other angles may be chosen. Similarly, a third group of electrodes 116 are connected to the top edges of the flakes 110, while a fourth group of electrodes 114 are connected to the bottom edges of the flakes. In the illustrated embodiment, the electrodes 114 run parallel to the electrodes 112, and the electrodes 116 run parallel to the electrodes 118. The crossbar structure allows an edge pair of each flake to be individually addressable for reading the bias voltage between the edges.

Figure 3:
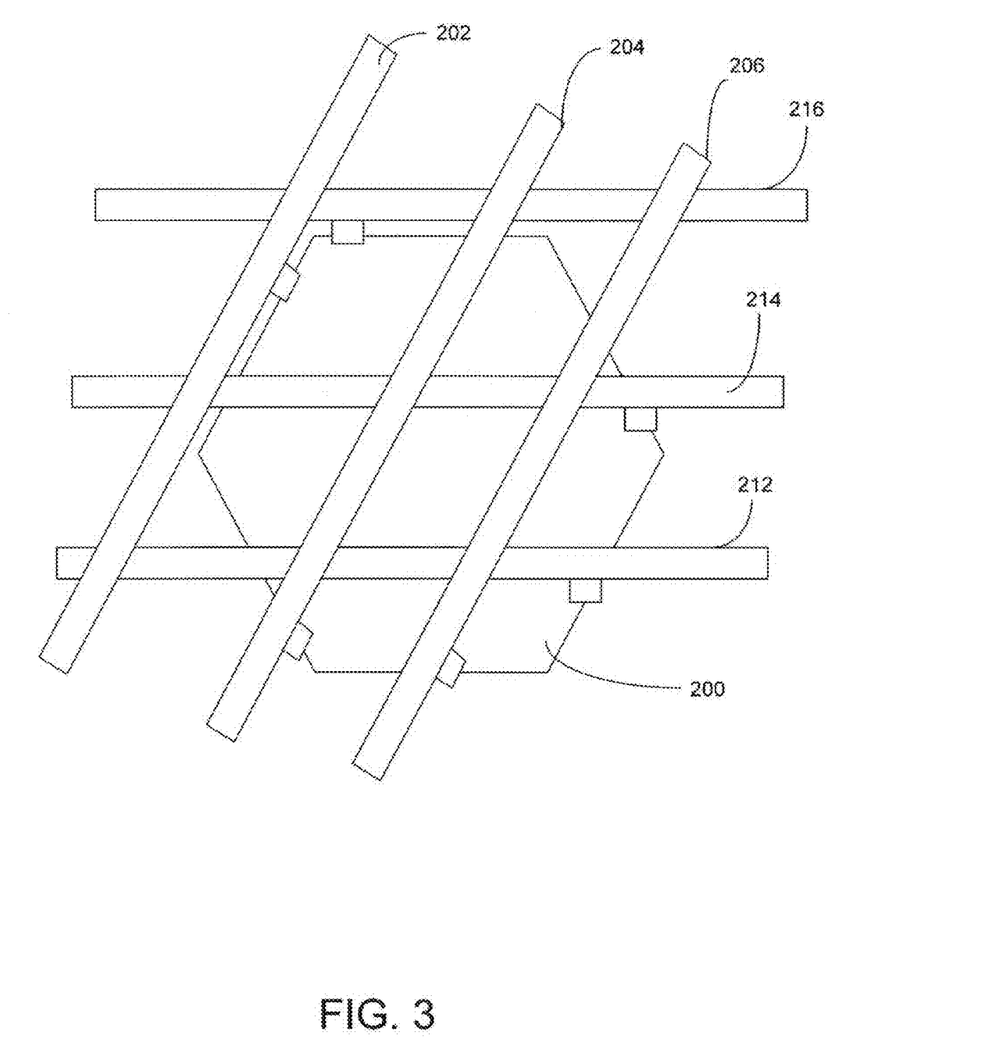
FIG. 3 is a schematic view of a hexagonal flexoelectric flake and electrodes in accordance with another embodiment of the invention.

The flexoelectric flakes in the sensor fabric do not have to be square or rectangular and can have other shapes. For example, FIG. 3 shows a flake 200 that is hexagonal. With the hexagonal shape, the flake 200 has three pairs of opposite edges, and each edge pair provides a component of the voltage polarization when the flake is bent. The electrodes connecting the flake edges can also be arranged into a crossbar structure. In the illustrated embodiment of FIG. 3, the electrodes 202, 204, and 206 are formed to be generally parallel and extend in a first direction, while the electrodes 212, 214, and 216 are generally parallel to each other and extend in a second direction at an angel from the first direction. The angle in the illustrated embodiment is about 60 degrees. The opposite edges in each edge pair of the flake 200 are connected, respectively, to one electrode running in the first direction and another electrode in the second direction.

The ability to detect the bending of individual flakes in the sensor fabric allows the sensor fabric to be used for touch sensing applications. When the sensor fabric is pressed against the surface of an object, each flake comes into contact with the object surface and conforms to the local surface contour. If the local surface contour has a curvature or undulation, the flake is bent along the surface and generates bias voltages between its opposite edges. The bias voltages between the edge pairs of the flake allow an analyzer to determine the curvature and bending direction of the object surface in contact with that flake. The aggregated information about the localized object surface contour as sensed by the flakes allows the analyzer to determine the shape of the object.

Moreover, besides the object shape, other attributes of the object surface can also be detected using the sensor fabric. As one example, the stiffness of the object surface may be detected with the sensor fabric. This may be done by pressing the sensor fabric against the object surface at different pressures. The yielding of the object surface in response to a pressure, which is an indication of the surface stiffness, produces different surface contours under different pressures. To measure the stiffness, the sensor fabric is first pressed against the surface with a first pressure, and the bias voltages of the flake edges are measured to detect the surface contour under that pressure. The sensor fabric is then pressed against the surface under a second pressure. The bias voltages of the flake edges are again measured to determine the surface contour under the second pressure. The changes in the surface contour as measured by the flakes of the sensor fabric as a function of the pressure change may then be used to derive the stiffness of the object surface.

The temperature of the object surface can also be measured using the sensor fabric. To that end, in one embodiment as illustrated in FIG. 1, thermal couple wires 220 may be attached to selected points in the sensor fabric 100 for detecting the surface temperature of the object at different locations.

Figure 7:
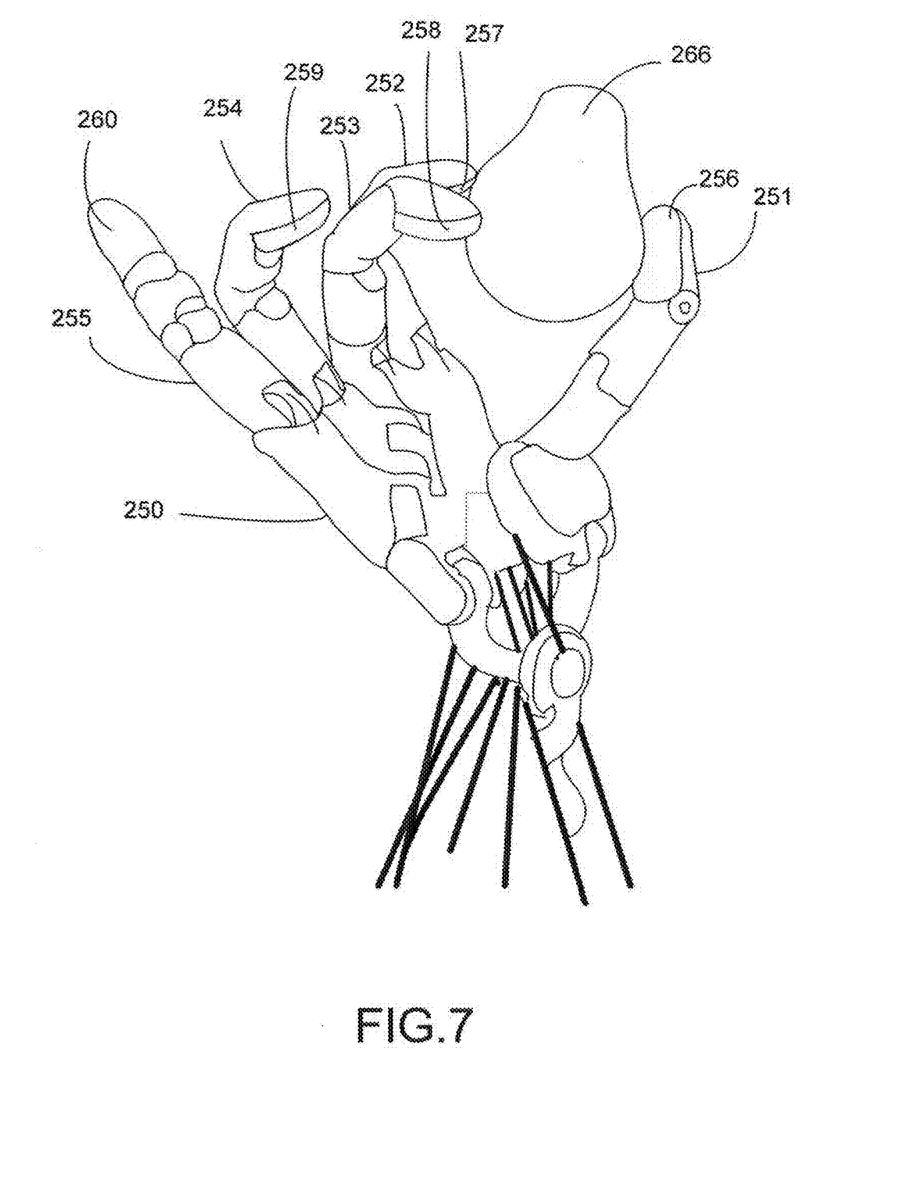
FIG. 7 is a schematic depiction of a robotic hand using sensor fabric patches on its finger tips for touch sensing.

As an example of the many possible uses of the sensor fabric, FIG. 7 shows a robotic hand 250 that uses the sensor fabric for touch sensing. The robotic hand 250 has a plurality of fingers 251-255. Patches 256-260 of the sensor fabric are attached to the tips the fingers. When the robotic hand 250 holds an object 266 with its fingers, the sensor fabric patches 256-258 of the fingers 251-253 holding the object 266 are pressed against the object surface. The bias voltages between the edges of the flexoelectric flakes in those sensor fabric patches 256-258 can be measured to determine the local object surface shape at each patch. By moving the robotic fingers along the object surface, the overall shape of the object 250 can be mapped out. This mimics how a human hand senses the shape of an object. As mentioned earlier, other attributes of the object surface, such as its temperature and stiffness, can also be detected.

It should be noted that the applications of the sensor fabric are not limited to robotic devices. There are many other applications in which the sensor fabric can be used to provide shape perception or touch sensing that is not achievable with prior art sensors. For instance, the compact form factor of the sensor fabric allows it to be used in places where even MEMS devices are too bulky. Also, the fabric can be constructed with chemically neutral materials to allow it to be used in harsh environments, including biological environments such as inside a human body as part of prosthetics, actuators, etc.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A sensor fabric for touch sensing, comprising:
    a plurality of flakes of a flexoelectric material, each flake having a first edge and a second edge opposite to the first edge, and opposing surfaces defining a plane, the first and second edges being disposed in the plane; and
    a plurality of electrodes connected to the flakes for sensing a bias voltage between the first and second edges of each flake, wherein the electrodes connected to the flakes include a first group of electrodes running in a first direction and a second group of electrodes running in a second direction, each electrode in the first group being connected to the first edges of the plurality of flakes, and each electrode in the second group being connected to the second edges of the plurality of flakes.

2. A sensor fabric as in claim 1, wherein the flexoelectric material has a two-dimensional non-centrosymmetric lattice structure.

3. A sensor fabric as in claim 2, wherein the flexoelectric material is boron nitride.

4. A sensor fabric as in claim 2, wherein the flexoelectric material is boron carbon nitride.

5. A sensor fabric as in claim 1, wherein each flake further includes a third edge and a fourth edge opposite to the third edge, and the electrodes further include a third group of electrodes running in the first direction and a fourth group of electrodes running in the second direction, each electrode in the third group being connected to the third edges of the plurality of flakes, and each electrode in the fourth group being connected to the fourth edges of the plurality of flakes.

6. A sensor fabric as in claim 1, further including a flexible substrate supporting the flakes and electrodes.

7. A sensor fabric as in claim 1, wherein the flakes have a rectangular shape.

8. A sensor fabric as in claim 1, wherein the flakes have a hexagonal shape.

9. A sensor fabric as in claim 1, wherein the first edge is substantially parallel to the second edge.

10. A method of sensing a shape of an object, comprising:
    placing a sensor fabric in contact with a surface of the object, the sensor fabric has a plurality of flakes of a flexoelectric material and a plurality of electrodes connected to the flakes, each flake having a first edge and a second edge opposite to the first edge, and opposing surfaces defining a plane, the first and second edges being disposed in the plane; and
    sensing a bias voltage between the first and second edges of each flake caused by bending of the flake,
    wherein the electrodes connected to the flakes include a first group of electrodes running in a first direction and a second group of electrodes running in a second direction, each electrode in the first group being connected to the first edges of the plurality of flakes, and each electrode in the second group being connected to the second edges of the plurality of flakes.

11. A method of sensing as in claim 10, wherein each flake of the sensor fabric further includes a third edge and a fourth edge opposite to the third edge, and the step of sensing further includes sensing a bias voltage between the third and fourth edges of each flake.

12. A method of sensing as in claim 11, wherein the flexoelectric material has a two-dimensional non-centrosymmetric lattice structure.

13. A method of sensing as in claim 12, wherein the flexoelectric material is boron nitride.

14. A method of sensing as in claim 12, wherein the flexoelectric material is boron carbon nitride.

15. A method of sensing as in claim 10, wherein the first edge is substantially parallel to the second edge.

16. A method of detecting stiffness of an object, comprising:
    placing a sensor fabric in contact with a surface of the object, the sensor fabric having a plurality of flakes of a flexoelectric material and a plurality of electrodes connected to the flakes, each flake having a first edge and a second edge opposite to the first edge, and a third edge and a fourth edge opposite to the third edge, and opposing surfaces defining a plane, the first, second, third and fourth edges being disposed in the plane;
    pressing the sensor fabric against the object surface with a first pressure;
    determining a first contour of the object surface under the first pressure by sensing a bias voltage between the first and second edges and a bias voltage between the third and fourth edges of each flake caused by bending of the flake;
    pressing the sensor fabric against the object surface with a second pressure; and
    determining a second contour of the object surface under the second pressure, wherein differences between the first and second contours provide an indication of the stiffness of the object
    wherein the electrodes connected to the flakes include a first group of electrodes running in a first direction and a second group of electrodes running in a second direction, each electrode in the first group being connected to the first edges of the plurality of flakes, and each electrode in the second group being connected to the second edges of the plurality of flakes.

17. A method of detecting stiffness as in claim 16, wherein the first edge is substantially parallel to the second edge.

* * * * *

UNITED STATES PATENT AND TRADEMARK OFFICE
CERTIFICATE OF CORRECTION

PATENT NO. : 8,327,721 B2
APPLICATION NO. : 12/605565
DATED : December 11, 2012
INVENTOR(S) : Alexandre Bratkovski et al.

It is certified that error appears in the above-identified patent and that said Letters Patent is hereby corrected as shown below:

In the Claims:

In column 6, line 37, in Claim 16, delete "object" and insert -- object, --, therefor.

Signed and Sealed this
Fourteenth Day of May, 2013

Teresa Stanek Rea
*Acting Director of the United States Patent and Trademark Office*